FIG. 1

INVENTOR
GERHARD SCHWESINGER
BY Harry M. Saranitz
ATTORNEY

$\theta$ (DEGREES)

INVENTOR.
GERHARD SCHWESINGER
BY Harry M. Saragoitz
ATTORNEY

Jan. 27, 1959  G. SCHWESINGER  2,870,673
LENTICULATED REAR PROJECTION SCREEN
Filed Nov. 26, 1954  7 Sheets-Sheet 6

INVENTOR.
GERHARD SCHWESINGER
BY Harry M. Saragovitz
ATTORNEY

Jan. 27, 1959 G. SCHWESINGER 2,870,673
LENTICULATED REAR PROJECTION SCREEN
Filed Nov. 26, 1954 7 Sheets-Sheet 7

INVENTOR.
GERHARD SCHWESINGER
BY Harry M. Saragovitz
ATTORNEY

United States Patent Office 2,870,673
Patented Jan. 27, 1959

2,870,673
LENTICULATED REAR PROJECTION SCREEN

Gerhard Schwesinger, Heidenheim (Brenz), Germany, assignor to the United States of America as represented by the Secretary of the Army Application November 26, 1954, Serial No. 471,545

3 Claims. (Cl. 88—28.93)

(Granted under Title 35, U. S. Code (1952), sec. 266)

The invention described herein may be manufactured and used by or for the Government for governmental purposes without the payment to me of any royalty thereon.

This invention relates to projection screens and more particularly to lenticulated rear projection screens.

Rear projection screens require low-absorbing screen materials of low surface reflection which, on the other hand, should spread the transmitted light uniformly over a certain desired range of viewing angles. In conventional scattering screens, these two requirements are physically incompatible.

Diffusing processes of random nature have a basic disadvantage when applied to rear projection surfaces. The angular brightness distribution of the screen, as seen by the observer, is in general far from uniform, and any attempt at improving it succeeds only at the expense of a higher reflection at the screen surface. This reflection is objectionable, not so much because it means a certain loss of projected light, but because of the loss of image contrast resulting from the simultaneous reflection of unavoidable ambient light on the viewing side of the screen.

It appears, therefore, that the two conflicting requirements of uniform brightness and low surface reflection cannot be reconciled in rear projection screens with random diffusion.

It is an object of this invention to provide a lenticulated rear projection screen whose characteristics are strictly controlled through optical design, rather than being dependent upon uncontrolled scattering and refraction by random surface irregularities.

Although, as will be shown hereinafter, the performance of spherically lenticulated screens exceeds that of randomly diffusing screens, the results of theory and experiments with such screens indicate that uniform screen brightness within a sharply defined viewing range can be attained only with aspherical lenticulation.

It is an object of this invention, therefore, to provide a lenticulated rear projection screen comprising a multitude of tiny aspherical lenses, preferably arranged in a honeycomb pattern.

It is a further object of this invention to provide a method of producing a lenticulated rear projection screen comprising a multitude of tiny aspherical lenses arranged in a honeycomb pattern.

Although the novel features which are believed to characterize this invention will be pointed out with particularity in the appended claims, the invention will be better understood by reference to the following description read in conjunction with the accompanying drawings in which:

The physical incompatibility of a low surface reflection and a flat brightness curve in rear projection screens with random diffusion is well established by photometric measurements and is also theoretically understood. The two basic processes responsible for the light diffusion in transmitting screens are scattering by randomly distributed microscopic or submicroscopic particles, and refraction and scattering at boundaries with random surface irregularities. Scattering by spherical particles of a size of the order of the wavelength diffuses the incident light beam in such manner that the greatest intensity occurs in the forward direction with a sharp decrease to the side. Little light is reflected backward. Multiple scattering makes the intensity distribution more and more uniform. While the forward intensity distribution is flattened, the backward reflection increases so that there is a kind of inverse relationship between the peak forward brightness and the reflection in the opposite direction. The same general relationship is found when random surface irregularities, rather than a dispersion of scattering particles, are the cause of light diffusion. In this case refraction at the larger surface irregularities and scattering at the smaller ones are the diffusing mechanisms involved.

Figure 1:
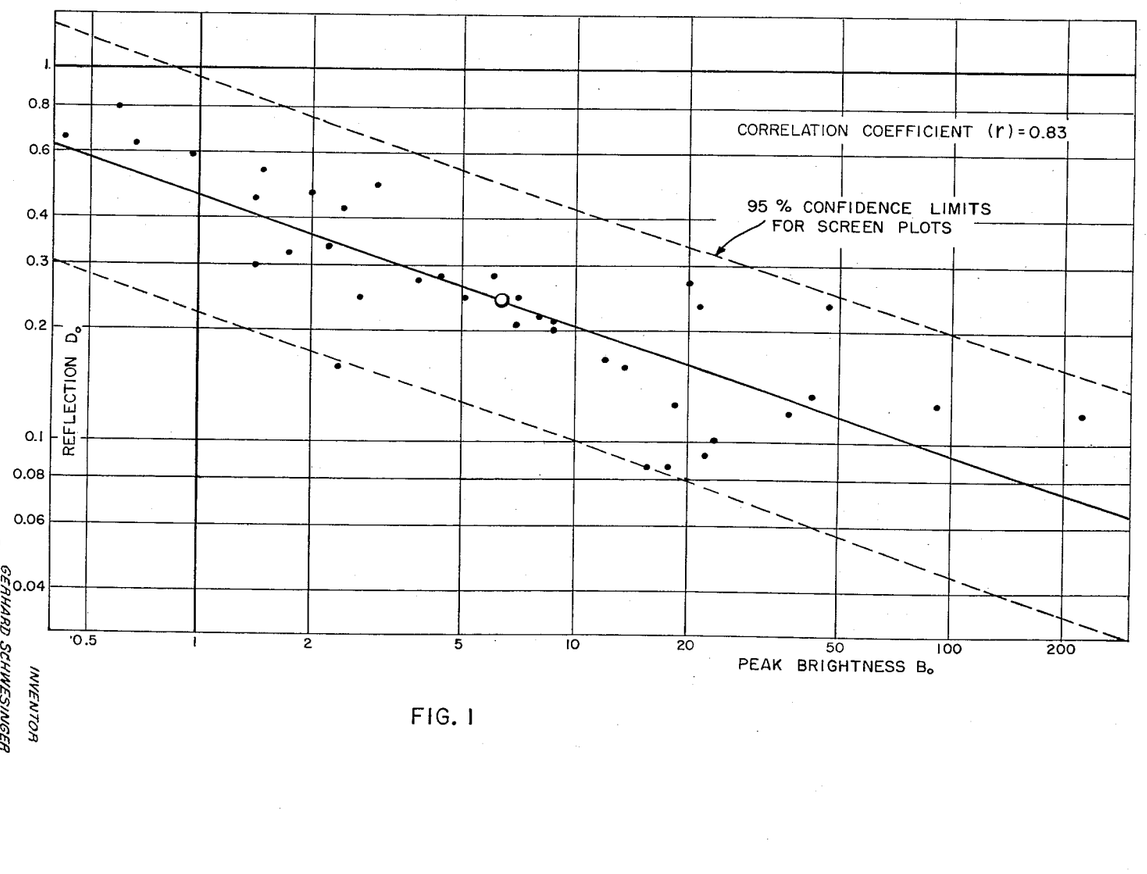
Fig. 1 demonstrates the correlation between forward peak brightness $B_0$ and backward reflection $D_0$ in randomly diffusing screens.

In practical screen surfaces these fundamental diffusing processes act in combination. Fig. 1 is a plot of the backward reflection $D_0$ versus the forward peak brightness $B_0$, both in logarithmic scales, for 37 diffusing surfaces which have been photometrically investigated. These screens cover a great variety of different characteristics, the peak brightness $B_0$ ranging from ½ to 200 times the brightness value of an ideal diffuse reflector of the Lambert type. Materials with appreciable absorption have been excluded from this selection. Since there is no statistical evidence to the contrary, it can be assumed that the plotted points scatter about a straight line with negative slope which, in fact, signifies some kind of inverse relationship with a correlation coefficient of $-0.83$. With 95 percent confidence randomly diffusing screens may be expected to lie in the belt limited by the two dotted curves.

The foregoing discussion was intended to demonstrate the futility of any attempt toward reconciling in randomly diffusing screens the two conflicting requirements of uniform forward brightness and low reflection. This situation has been clearly appreciated in recent investigations and developments which emphasize the need of improving screen characteristics through controlled optical design, rather than through utilizing random processes.

The first experiments were made with spherically lenticulated screens, samples of which were produced by pressing a tightly packed layer of polished steel balls into a sheet of plastic at its softening temperature. Thus the screen is composed of a multitude of planoconcave lenses, each forming a virtual image of the exit pupil of the projector. The divergent beams issuing from each virtual image fill an angular range that is determined by the relative aperture of the lenses and the refractive index of the screen material.

Figure 2:
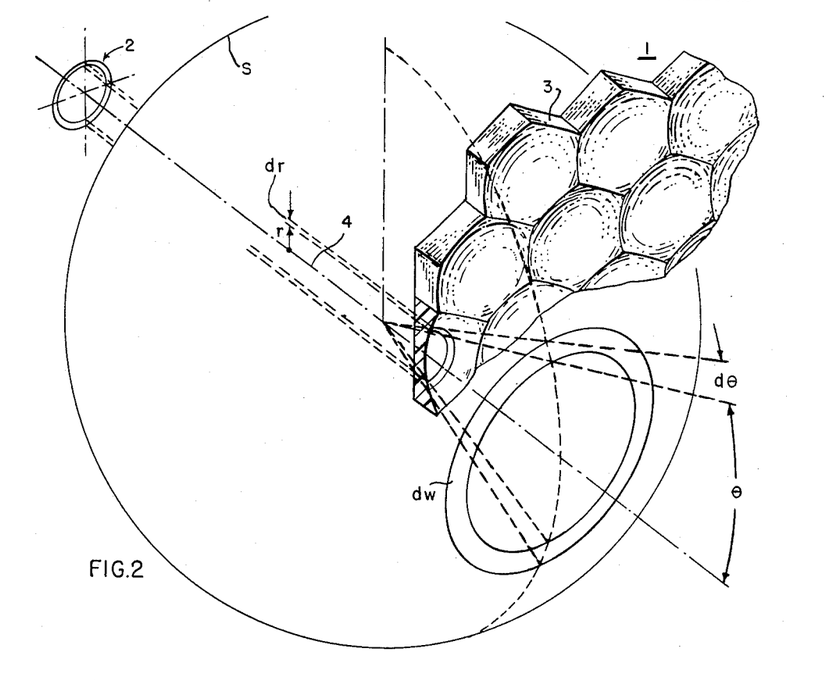
Figs. 2 and 3A and 3B are utilized to derive the apparent brightness of a lenticulated screen for types A and B lenticulations.

The resulting intensity distribution is not uniform, however, as will be discussed from Fig. 2 which shows a small portion of the screen lenticulation 1 facing the observer and receiving directed light from the exit pupil 2 of the projector, not shown. It is, of course, assumed that the cells 3 of the lenticulation are not larger than the image detail that is to be resolved on the screen. Consider now the cell which lies on the projector axis 4. The incident light beam, after passing straight through the smooth surface of the screen, undergoes refraction at the lenticulated surface and thereafter fills a solid angle of aperture $\theta$. The apex of this solid angle marks the position of the virtual image of the projector pupil around which a sphere S of unit radius is described. At a certain illumination on the screen cell, the light flux which passes through the indicated zone of radius r and width dr is proportional to the area of this zone so that $$dF = 2\pi k r dr \qquad (1)$$

This flux fills the solid angle $d\omega$ which is marked on the unit sphere as an annular area of size $$d\omega = 2\pi \sin\theta\, d\theta \qquad (2)$$

The screen intensity emitted in the direction $\theta$ therefore equals $$I_\theta = \frac{dF}{d\omega} = k\frac{rdr}{\sin\theta d\theta} = \frac{k}{2\sin\theta}\frac{d}{d\theta}(r^2) \qquad (3)$$

When divided by $\cos\theta$, the last expression represents a quantity which is proportional to the apparent screen brightness $B_\theta$ in the direction $\theta$. Thus $$B_\theta = k\frac{d(r^2)}{d(\sin^2\theta)} \qquad (4)$$

Expressing r by the radius of cell curvature R and the angle of incidence at the zone r, $$r = R\sin\varphi$$

one obtains $$B_\theta = k\frac{d(\sin^2\varphi)}{d(\sin^2\theta)} \qquad (5)$$

In order to find the brightness near the axis where both $\theta$ and $\varphi$ are very small, one may use the paraxial relations $$\sin\theta = \theta$$
$$\sin\varphi = \varphi$$
$$\theta = (n-1)\varphi$$

where n is the refractive index of the screen material. Thus in the axis, $\theta = 0$, $$B_0 = k/(n-1)^2 \qquad (6)$$

Combining Eqs. 5 and 6

$$\frac{B_\theta}{B_0} = (n-1)^2\frac{d(\sin^2\varphi)}{d(\sin^2\theta)} \qquad (7)$$

or $$\frac{B_\theta}{B_0} = \frac{(n-1)^2}{2\sin\theta\cos\theta}\frac{d}{d\theta}(\sin^2\varphi) \qquad (8)$$

The relative screen brightness $B_\theta/B_0$ as a function of the viewing angle $\theta$ alone is obtained if in Eq. 7 or 8 the angle $\varphi$ is expressed in terms of $\theta$. This will now be done separately for the two cases to be considered, namely, type A lenticulation, facing the observer, and type B lenticulation, facing the projector.

(a) *Lenticulation toward observer (type A)*

Figure 3A:
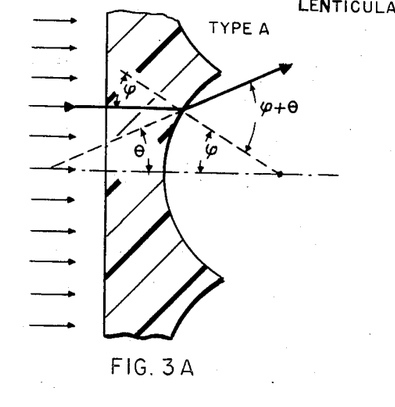

From Fig. 3A one reads $$\sin(\varphi+\theta) = n\sin\varphi \qquad (9)$$

It should be noted that the beam can be spread to a maximum viewing angle $\theta_1$ which is reached at the limit of total reflection where $\varphi+\theta=90°$. Thus $$\cos\theta_1 = 1/n \qquad (10)$$

Eq. 9 can be solved for $\sin^2\varphi$ by applying the addition theorem of the sine function and subsequently separating the sine and cosine terms in $\varphi$. The result is $$\sin^2\varphi = \sin^2\theta\,/(n^2+1-2n\cos\theta) \qquad (11)$$

After differentiating the right side with respect to $\theta$, one obtains in connection with Eq. 8 the following relative screen brightness $$\frac{B_\theta}{B_0} = (n-1)^2\frac{(n^2+1)\cos\theta - \tfrac{1}{2}n\cos 2\theta - \tfrac{3}{2}n}{(n^2+1-2n\cos\theta)^2\cos\theta} \qquad (12)$$

As can be verified by substituting $\theta_1$, from Eq. 10, the brightness drops to zero at the limit of total reflection.

(b) *Lenticulation toward projector (type B)*

Figure 3B:
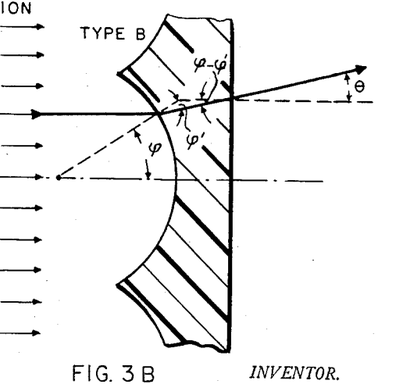

From Fig. 3B $$\sin\varphi' = \frac{1}{n}\sin\varphi \qquad (13)$$

$$\sin\theta = n\sin(\varphi-\varphi') \qquad (14)$$

Eliminating from these two equations $\varphi'$ and solving for $\varphi$ one finds $$\sin^2\varphi = (n^2+1+2R)\sin^2\theta/S \qquad (15)$$

where $$R = \sqrt{n^2-\sin^2\theta} \qquad (16)$$

$$S = (n^2-1)^2 + 4\sin^2\theta \qquad (17)$$

It can be shown that in this case the beam can be spread over the entire hemispherical viewing space, provided $$n \geq \sqrt{2}$$

Upon substitution of Eq. 15 into Eq. 7, the following screen brightness is found $$\frac{B_\theta}{B_0} = (n-1)^2\left[\left(\frac{n^2-1}{S}\right)^2(n^2+1+2R) - \frac{\sin^2\theta}{RS}\right] \qquad (18)$$

Figure 4:
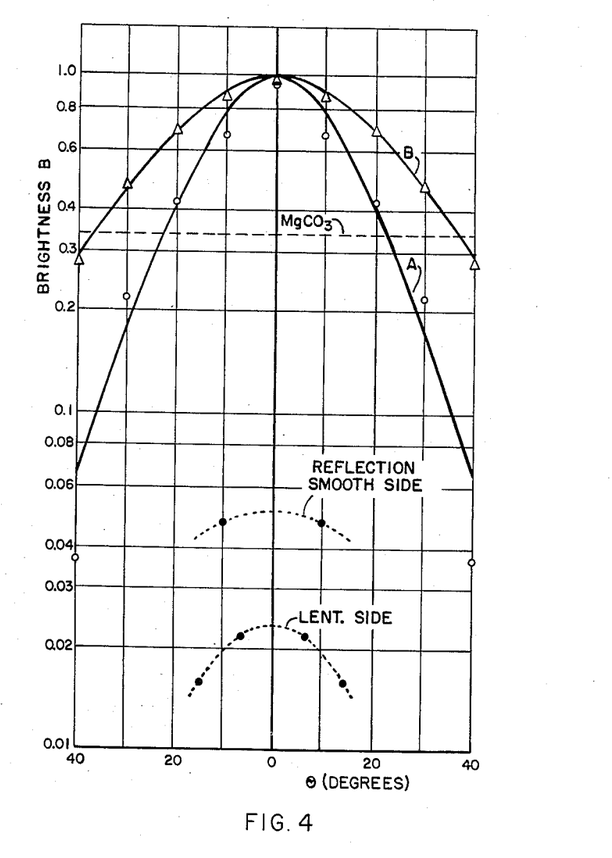
Fig. 4 shows the brightness curves for spherical lenticulation of types A and B.

Fig. 4 is a plot of the theoretical brightness curves for the two cases considered above. It appears that the two curves differ remarkably. Both check well with readings, except the very lowest reading, taken with an SEI exposure meter on an actual screen sample with spherical lenticulation. In addition to the transmitted light, the reflection on both sides of the screen was also measured, as well as the comparative brightness of a magnesium carbonate surface under the same illumination. Although in both cases the brightness is far from uniform, a much better result is obtained with a type B screen where the lenticulation faces the projector. It should be noted, however, that the lenticulation produced for this experiment was unnecessarily deep for a type A aplication so that total reflection occurred at the outer zones of the lens cells, resulting in reduced transmission.

With regard to contrast rendition, the type A screen is superior because of its low reflection on the viewing side, despite the fact that it reflects more light backward than the type B screen. It can be shown that the image contrast suffers more from an increase in reflection on the viewing side than from an increased backward reflection, although the latter contributes, of course, to the ambient stray light.

Figure 5:
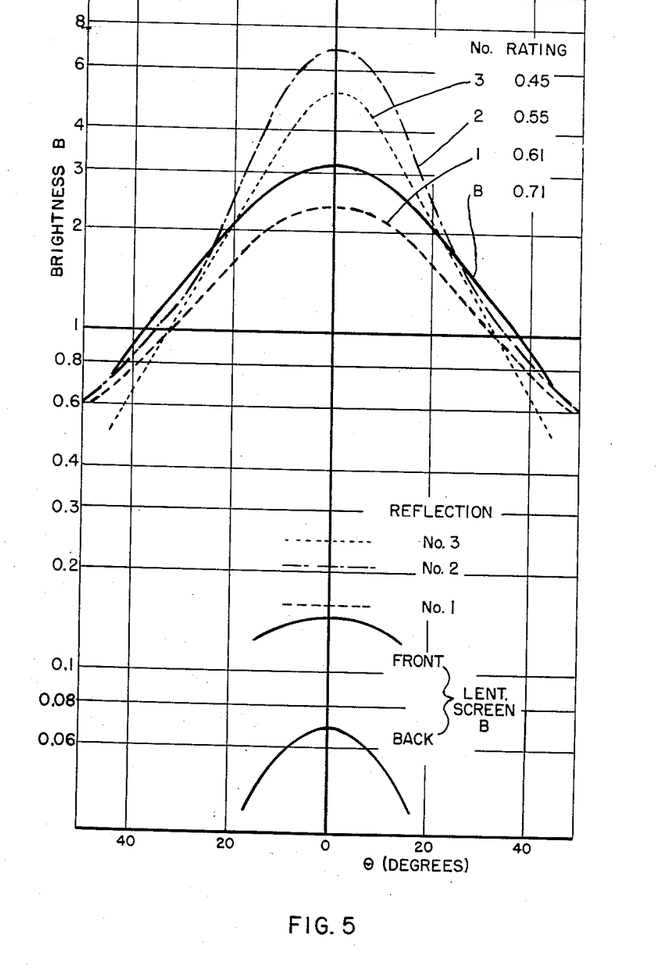
Fig. 5 shows a comparison between spherical type B lenticulation and three high ranking diffusing screens.

Case B is again plotted in Fig. 5 for comparison with three other screens 1, 2 and 3 which have been selected as highest ranking representatives of similar brightness distribution from a group of about 40 screen materials measured at the Massachusetts Institute of Technology. The rating marked at each curve is a performance criterion. This performance figure is defined so as to give preference to screens which reconcile to the best possible degree the mutually exclusive properties of high transmission and flat brightness distribution, or, in other words, the properties of low surface reflection and freedom of "hot spots." The surface reflection of each screen, in the direction of the screen normal, is indicated by the marks in the lower part of Fig. 5. It appears that the lenticulated screen exceeds the performance of screen No. 1 which itself ranks highest among the three best screens selected.

Figure 6A:
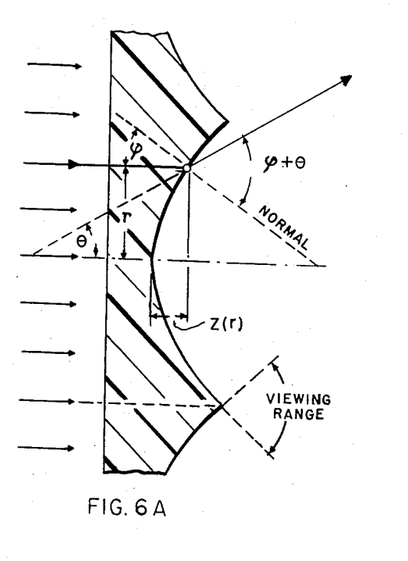
Figs. 6A and 6B serve to demonstrate the optical equivalence of positive and negative lenticulation.
Figure 6B:
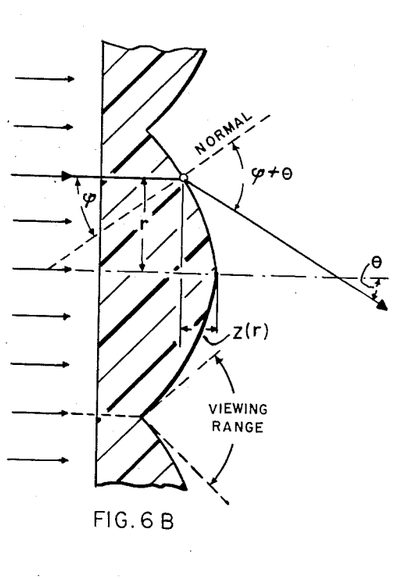

The results of theory and experiments with spherically lenticulated screens indicate that uniform screen brightness can only be attained with aspherical lenses. Since different brightness curves were found depending on whether the lenticulated surface was illuminated from the front or from the back, it can be concluded that two different aspherical lens shapes are required in these two cases for producing uniform brightness. Either shape can be used as a positive or negative lens. As shown by Fig. 6A and Fig. 6B for the case that the lenticulation lies on the viewing side, the same mathematical Relation 9 holds for the deflection of the light beam by a negative or positive element. The only difference is the sign reversal of $\theta$, however, does not affect the brightness curve because of its symmetry. This appears also from Eq. 4 which for uniform brightness $B_\theta$ modifies to $$\frac{d(r^2)}{d(\sin^2\theta)} = \text{const}$$

or $$r = \pm c \sin\theta \tag{19}$$

In the following, the shape of the lenticulation will be calculated for a type A screen. It follows then from Eq. 9, which is valid for lenticulation of any shape, that $$\tan\varphi = \sin\theta / (n - \cos\theta) \tag{20}$$

Figure 8:
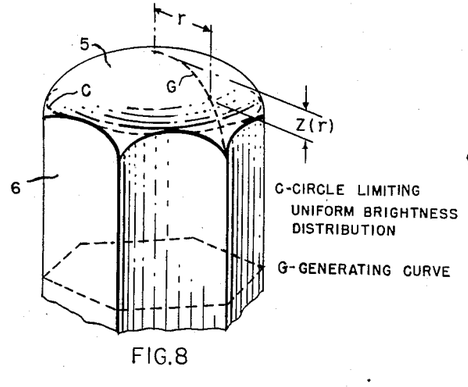
Fig. 8 illustrates a hexagonal molding bar with aspherical end face.

If $r$ and $z$ are the coordinates of the generating curve G of the lenticulation, as shown in Fig. 8, the tangent of the angle of incidence can be expressed as $$\tan\varphi = \frac{dz}{dr} \tag{21}$$

Substituting from Eqs. 19 and 20, one obtains $$\frac{dz}{dr} = \pm \frac{r}{c} / (n - \sqrt{1 - r^2/c^2}) \tag{22}$$

and after integrating between the limits zero and $r$ $$\pm \frac{z}{c} = \sqrt{1 - r^2/c^2} - 1 + n \log_e \frac{n - \sqrt{1 - r^2/c^2}}{n - 1} \tag{23}$$

The two solutions obtained differ only in the sign of $z$ which means that the lenticulation can be either convex or concave.

The parameter $c$ which has the dimension of a length determines the size of the lens cells. Obviously the cell radius should be limited to a value below the limit of total reflection because an extension beyond this limit would only increase the undesired backward reflection. If this maximum radius, at the limit of total reflection, is denoted by $r_1$, one obtains from Eq. 19, after substituting for $\theta$ the value $\theta_1$ following from Eq. 10, $$c = nr_1/(n^2 - 1)^{1/2} \tag{24}$$

The choice of $r_1$, depends on the minimum viewing distance to be expected in the practical use of the screen. The eyes of the observer sitting closest to the screen should not be able to resolve the lenticulated structure. He should have the impression of a homogeneous screen surface of uniform brightness. Assuming a sufficiently high value for the observer's visual acuity, one can easily estimate the largest permissible cell size for a given minimum viewing distance. The following Table 1 gives numerical values for a generating curve computed with a refractive index n of 1.59 and a maximum viewing angle of 48 degrees, 3 degrees below the limit of total reflection.

TABLE 1

| $\theta$ | 0 | 10° | 20° | 30° | 40° | 48° |
|---|---|---|---|---|---|---|
| $r/c$ | 0 | 0.1737 | 0.3420 | 0.5000 | 0.6428 | 0.7431 |
| $z/c$ | 0 | 0.0252 | 0.0944 | 0.1914 | 0.2971 | 0.3770 |

Figure 7:
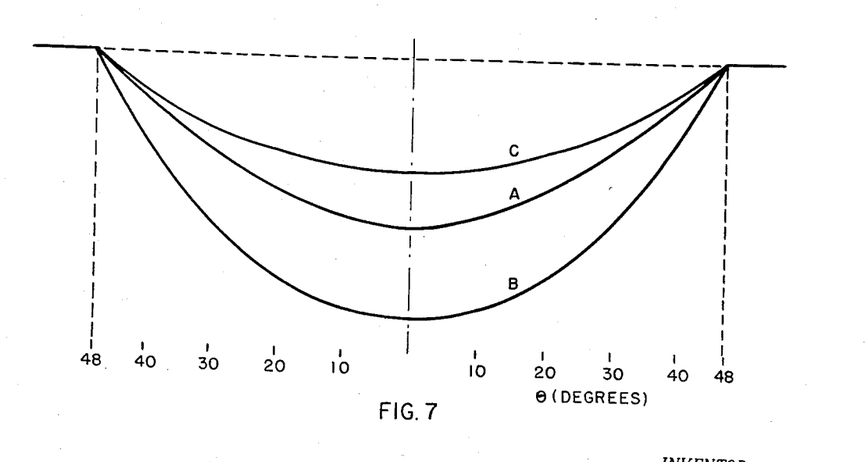
Fig. 7 shows the generating curves of three different lenticulations for the same viewing range.

The above values are plotted in Fig. 7 as curve A. For comparison, curve C represents a spherical lens for the same maximum angle of 48 degrees. It appears that the aspherical surface flattens considerably toward the edge, thus producing a lenticulation of larger depth. A still larger depth of the cells is required if the aspherical lenticulation is designed to face the projector. This case is illustrated by curve B. Although this arrangement has the advantage of permitting a wide viewing range, similar to the type B of spherical lenticulation, it has another shortcoming, beside the large depth required, which will be discussed later.

Formulae for calculating the generating curve B may be similarly developed.

The mathematical derivation given above for a type A lenticulation neglects the amount of light which is reflected at the screen surface, according to Fresnel's laws. The coefficient of reflection depends on the refractive index and the angle of incidence. At small angles the reflection amounts to a few percent only. However, as the angle of incidence approaches the limit where total reflection occurs, the coefficient of reflection rises sharply to finally reach a value of unity. Therefore the screen brightness is appreciably reduced at large viewing angles if the type A lenticulation transmits rays close to the limit of total reflection, such as was the case in the example given in Table 1.

It might, therefore, seem that the type B lenticulation is preferable since it does not involve any projected rays near the limit of total reflection. Unfortunately this advantage is obviated by total reflection of ambient light which now occurs on the viewing side of the screen, resulting in a loss of image contrast. This contrast reduction is more objectionable than the loss in transmission which must be accepted in type A screens. It is further aggravated by the large depth of the type B lenticulation which increases the relative portion of the screen area in which total reflection of unavoidable ambient light is liable to occur.

For these reasons the type A lenticulation must be considered more important for practical application. A cutting tool profiled according to the generating curve of Table 1 was used for figuring one of the end faces 5 of hexagonal stock 6, as shown in Fig. 8. A large number of such bars was assembled in a honeycomb (Fig. 9) pattern serving as part of a mold from which compression moldings were made of polystyrene.

Figure 10:
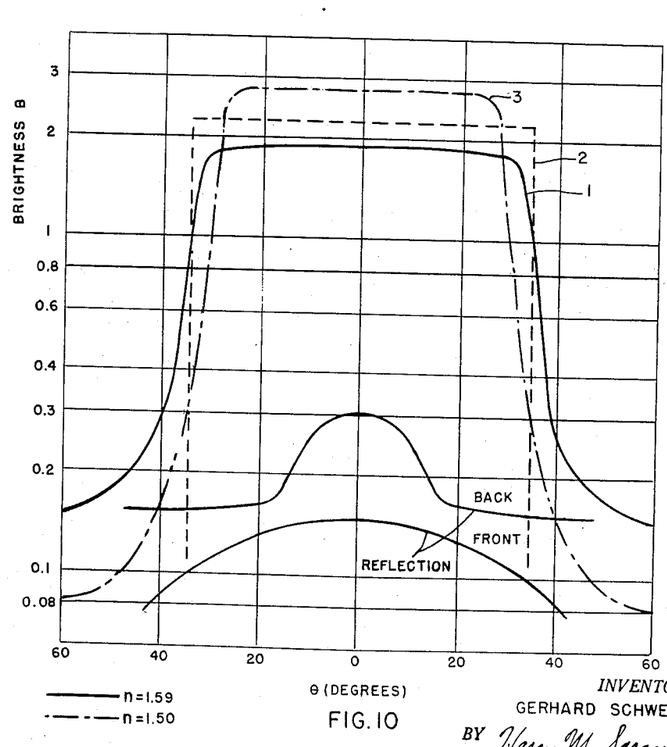
Fig. 10 shows the brightness curves of lenticulated rear projection screens with aspherical lenticulation.

The result of the photometric test of such a screen is shown in Fig. 10, curve 1, from which the great improvement in uniformity of brightness is plainly apparent. The viewing range of this sample is about ±35 degrees, with an almost abrupt fall-off beyond this limit. The coefficient of reflection on the viewing side amounts to about 15 percent in the axis. This figure is lower than that found for any other non-absorbing rear projection screen with comparable viewing range. The backward reflection is somewhat higher in the axis, about 30 percent, because of the close approach to the limit of total reflection as discussed above. Off axis, however, the backward reflection goes down to about 15 percent. With this amount of reflection, a screen with a perfectly uniform brightness distribution over the range of ±35 degrees would have a characteristic as shown by the dotted rectangle 2. It appears that the experimental screen with a performance rating of 0.87 comes close to this ideal case.

In order to ascertain how much the screen characteristic is affected by a change of refractive index, the same mold was used for making moldings of Plexiglas with a refractive index of 1.50. The dash-dotted curve 3 in Fig. 10 shows that, as to be expected, the forward brightness is somewhat increased at the expense of a slightly reduced viewing range. Since all the experiments conducted militate against an extension of the viewing range close to the critical angle of total reflection, it appears that the maximum viewing angle should be limited to a value which lies below the critical limit by an amount greater than 3 degrees such as was assumed in Table 1. The values in Table 2 are therefore computed with a safety margin of 10 degrees. The maximum viewing angle listed corresponds to those rays which pass through the circles inscribed to the hexagonal lens cells (see Fig. 8).

TABLE 2

| Refractive index | 1.50 | 1.55 | 1.60 | 1.65 |
|---|---|---|---|---|
| Maximum viewing angle, degrees | 32.3 | 33.6 | 34.8 | 36.0 |

All rays transmitted within these inscribed circles produce a uniform brightness distribution. Beyond these circles the brightness starts to fall off with increasing steepness. The amount of light in this fall-off region is 9 percent of the total light. Table 2 shows the gain in viewing range achieved by increasing the refractive index. The viewing range of such a screen seems to be limited to a maximum of ±35 to 40 degrees.

An extension of the viewing range, if required, is always possible by using type B lenticulation, but this, of course, at the expense of a reduced image contrast. In this regard it should be noted, however, that conventional screens having a useful viewing range of over 40 degrees are also poor in image contrast, very likely much poorer than type B screens would ever be for the same viewing range.

The above-mentioned aspherically lenticulated screens may be produced by the method previously indicated, i. e. by assembling a large number of hexagonal members 6 into a mold 7 (see Fig. 9) and making compression moldings of a transparent screen material such as, for example, polystyrene. This method, however, is feasible only for very small screens.

Figure 9:
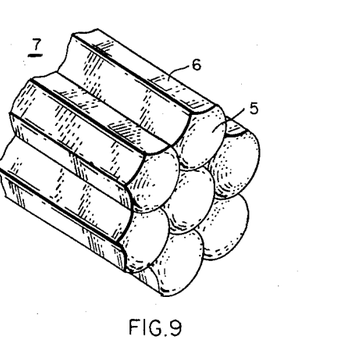
Fig. 9 illustrates a honeycomb assembly of molding bars.
Figure 11:
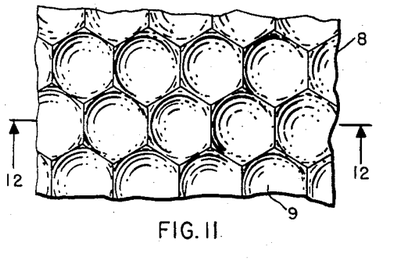
Figs. 11–16 serve to illustrate methods of producing lenticulated rear projection screens according to this invention.
Figure 12:
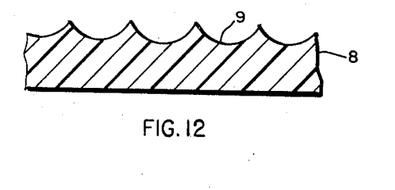
Figure 13:
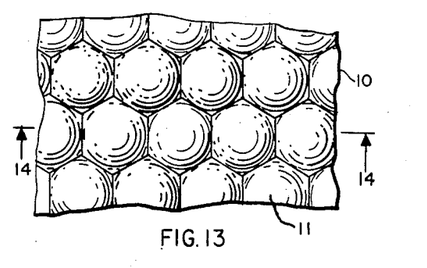
Figure 14:
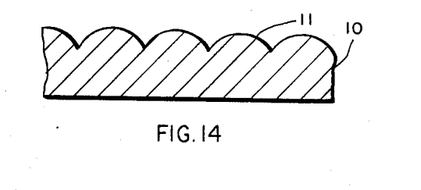

Screens too large to be produced by the above method may be produced by one of the following methods. The assembled honeycomb pattern of Fig. 9 is utilized as a press tool or die from which a matrix is formed from some suitable matrix material. Figs. 11 and 12 illustrate a portion of a matrix 8 comprising a plurality of lenticulations 9, Fig. 12 being a section taken along line 12—12 of Fig. 11. A master mold is thereafter made from matrix 8 by any well known duplicating process, such, for example, as electrodeposition or such techniques as are well known in the arts of preparing printing plates for stamps, currency or the like. Figs. 13 and 14 illustrate a portion of such a mold 10 comprising a plurality of lenticulations 11, Fig. 14 being a section along line 13—13 of Fig. 13.

Figure 15:
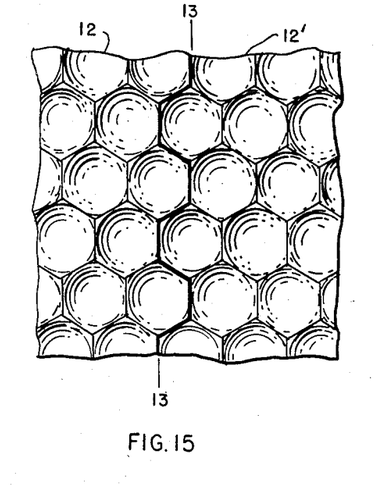

The mold 10 may thereafter be utilized as a master mold for producing by stamping or molding, for example, a plurality of sections of screen 12, 12' (Fig. 15) joined together in any suitable manner, as along 13—13 in Fig. 15. The number of sections is, of course, determined by the size screen desired.

Figure 16:
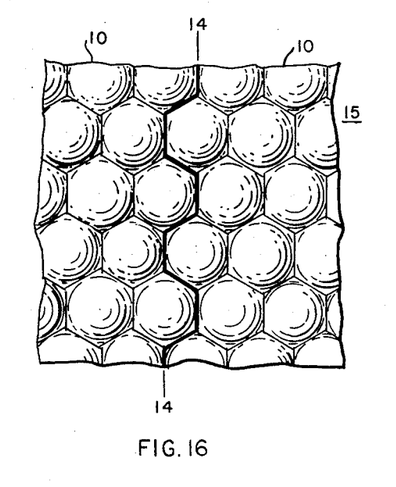

An alternate method of producing the screen of this invention comprises making a plurality of molds 10, joined together, as along 14—14 of Fig. 16. The size of screen desired will determine the number of sections of mold 10 necessary. The assembled mold 15, a section of which is shown in Fig. 16, is utilized to produce a projection screen by, for example, stamping or molding.

An alternate method of forming the master mold comprises repeatedly applying an end mill of the desired curvature to a mold material in the pattern of a honeycomb. The intersections between adjacent recesses would inherently correspond to the adjacent edges of the hexagonal bars without the necessity of assembling a plurality of such bars. Such a mold may then be transferred through one or more duplicating stages to provide molds or materials of either convex or concave form. Such duplicating processes are well known in many arts, as mentioned above.

While the invention has been described with reference to the structures shown, it is not restricted to the details herein disclosed and this application is intended to cover such modifications or departures as may come within the scope of the following claims.

I claim:
1. A lenticulated rear projection screen comprising a sheet of transparent screen material, one surface of which is plane and the other surface of which is made up of a multitude of adjoining tiny aspherical lenses, said lenses each having optical axes which are substantially parallel, said lenses each having surfaces tangent to a common plane at points where said optical axes are perpendicular to said plane, the surface curvature of each lens conforming substantially to a generating curve defined by

$$\pm \frac{z}{c} = \sqrt{1-r^2/c^2} - 1 + n \log_e \frac{n-\sqrt{1-r^2/c^2}}{n-1}$$

where:

$z$ and $r$ are the coodinates of said generating curve,
$n$ is the refractive index of said screen material,
$c$ is a parameter having the dimension of a length and determined by $c = nr_1/(n^2-1)^{1/2}$
$n$ is the refractive index of said screen material,
$r_1$ is the radius as measured outwardly and perpendicularly from the optical axis to the surface of one of said lenses at the limit of total reflection and $r$ is greater than zero and equal to or less than $r_1$.

2. A lenticulated rear projection screen according to claim 1 wherein said lenses are arranged in a honeycomb pattern.

3. A lenticulated rear projection screen according to claim 2 wherein each of said lenses is polygonal in cross section.

References Cited in the file of this patent

UNITED STATES PATENTS

| 595,273 | Soper | Dec. 7, 1897 |
| 1,784,906 | Oxhandler | Dec. 16, 1930 |
| 1,970,358 | Bull et al. | Aug. 14, 1934 |
| 2,071,344 | Jackman | Feb. 23, 1937 |
| 2,207,835 | Sukumlyn | July 16, 1940 |
| 2,292,152 | Newcomer | Aug. 4, 1942 |
| 2,627,200 | Huber | Feb. 3, 1953 |